Feb. 23, 1932.    J. S. LACH    1,846,645
AUTOMATIC FEED FOR ARCUATE ARTICLES
Filed Aug. 28, 1929    4 Sheets-Sheet 1

INVENTOR
Joseph S. Lach,
by Harry R. Williams, atty.

Feb. 23, 1932.  J. S. LACH  1,846,645

AUTOMATIC FEED FOR ARCUATE ARTICLES

Filed Aug. 28, 1929  4 Sheets-Sheet 2

INVENTOR
Joseph S Lach
by
Harry R Williams
Atty.

Feb. 23, 1932.  J. S. LACH  1,846,645
AUTOMATIC FEED FOR ARCUATE ARTICLES
Filed Aug. 28, 1929  4 Sheets-Sheet 3
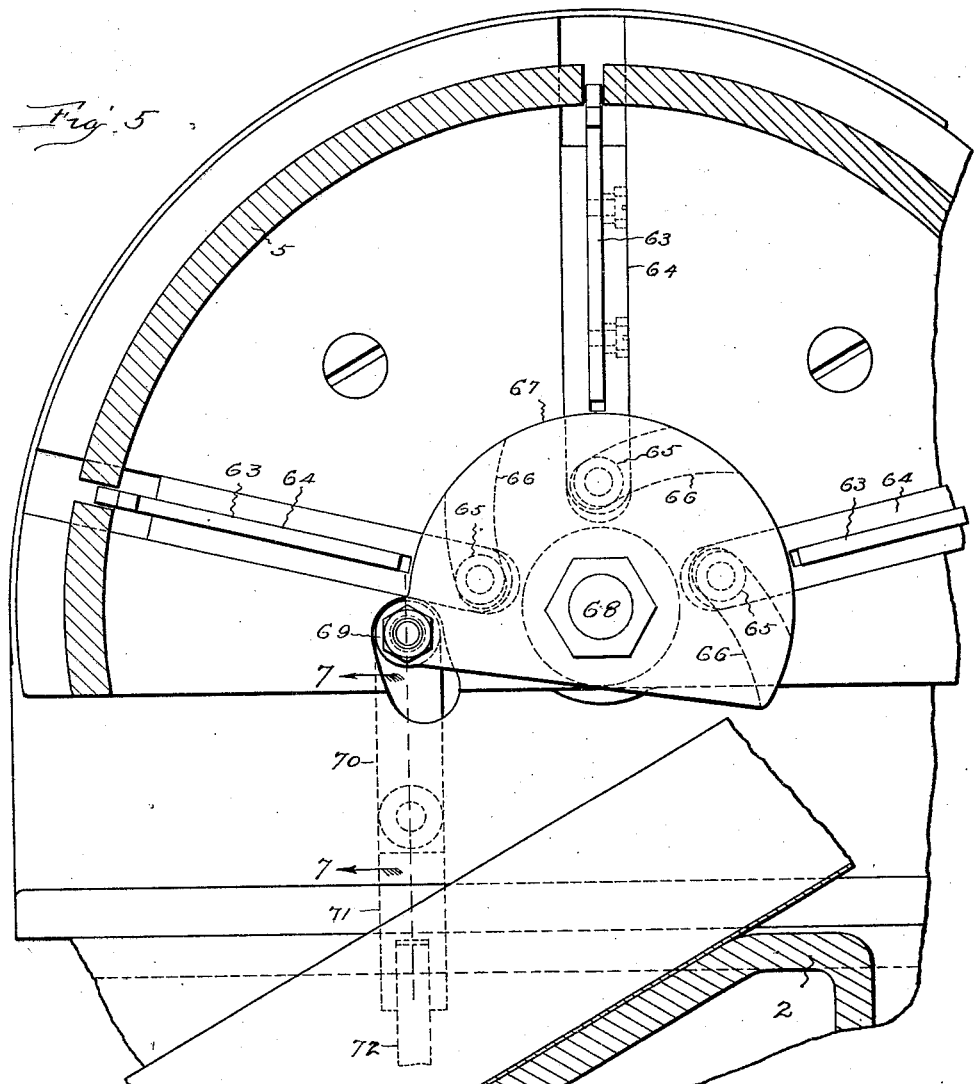
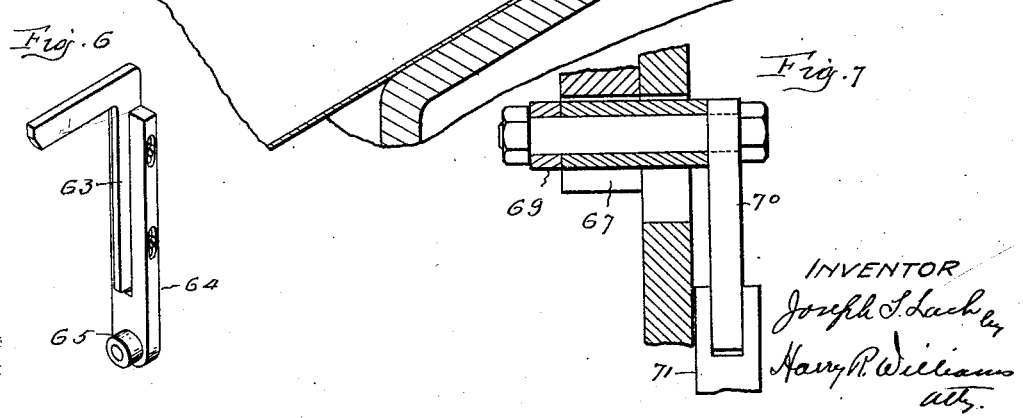

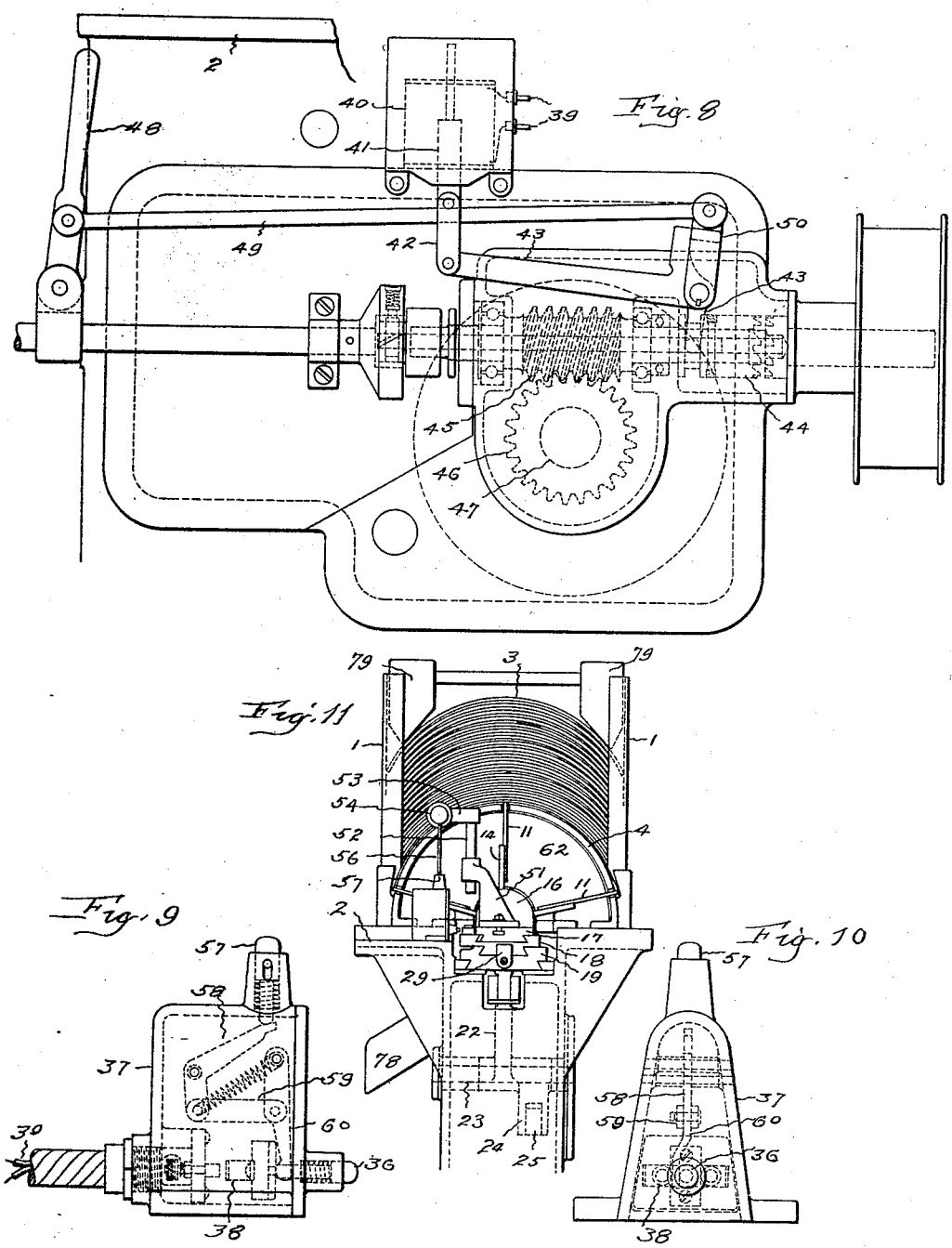

Patented Feb. 23, 1932

1,846,645

UNITED STATES PATENT OFFICE

JOSEPH S. LACH, OF BRIDGEPORT, CONNECTICUT

AUTOMATIC FEED FOR ARCUATE ARTICLES

Application filed August 28, 1929. Serial No. 388,889.

This invention relates to means for feeding arcuate pieces of work to a machine which has a plurality of tool spindles adapted to receive drilling, counter-boring, countersinking, reaming, tapping and the like tools or any combination of these, which spindles are adjustable so that the operations may be performed at different radial and axial positions on the curved work which is fed thereto. A machine of this character is illustrated and described in an application filed by me February 1, 1929, Serial No. 336,860.

The object of the present invention is to provide means which will, in cooperation with the actions of the tool spindles, automatically feed curved pieces of work in succession very rapidly into and hold them in exact position to be accurately operated upon by the tools of such a machine, and machines of like character, and then discharge them therefrom.

The feeding mechanism which is illustrated as embodying the invention has a magazine in which the curved pieces of work to be operated upon are placed, the magazine desirably being arranged vertically, although it may be arranged horizontally. A curved support or saddle extends from the magazine to an arcuate tool guiding jig, and means are provided for successively feeding the pieces of work from the magazine and clamping them opposite the jig. There are also means for stopping the feed or giving a signal when the magazine is empty or should the feeding action be obstructed.

Figure 1:
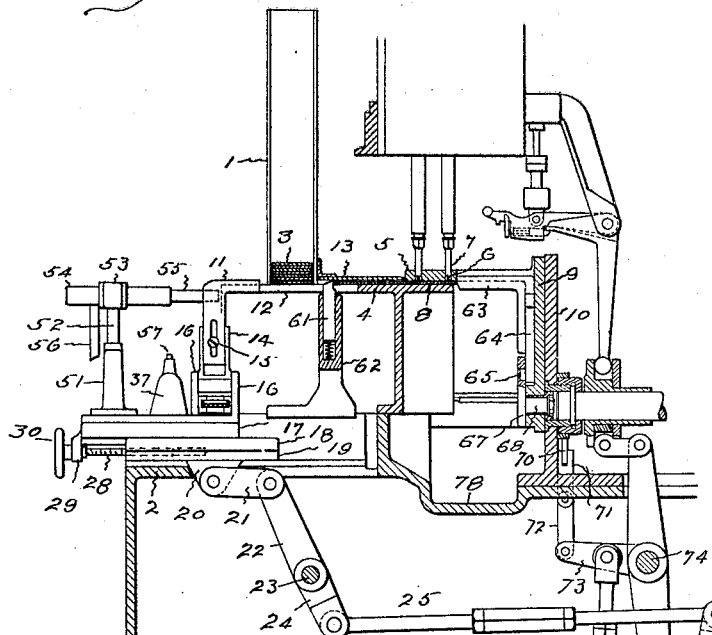
Figure 2:
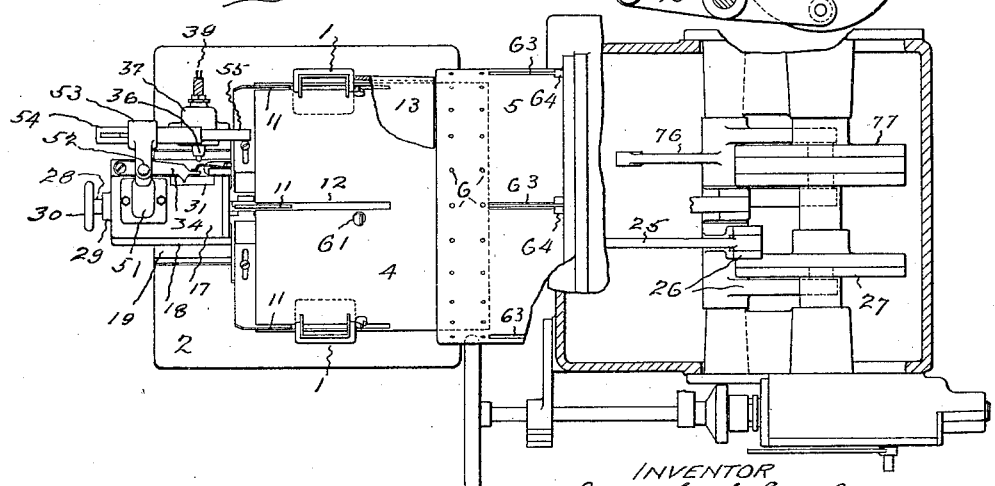
Figure 3:
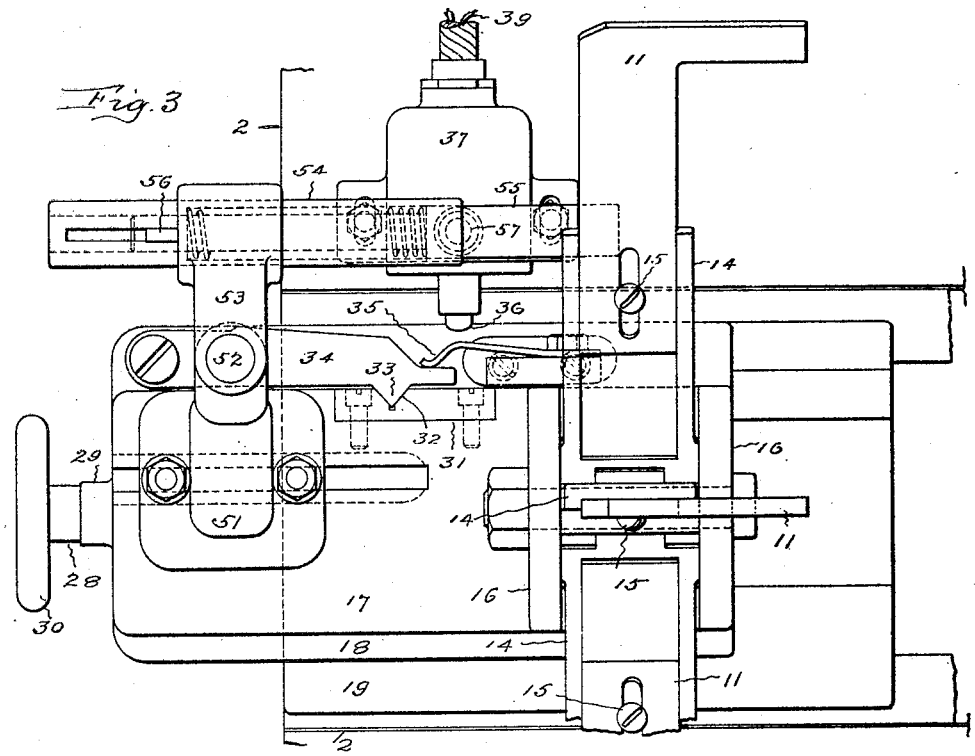
Figure 4:
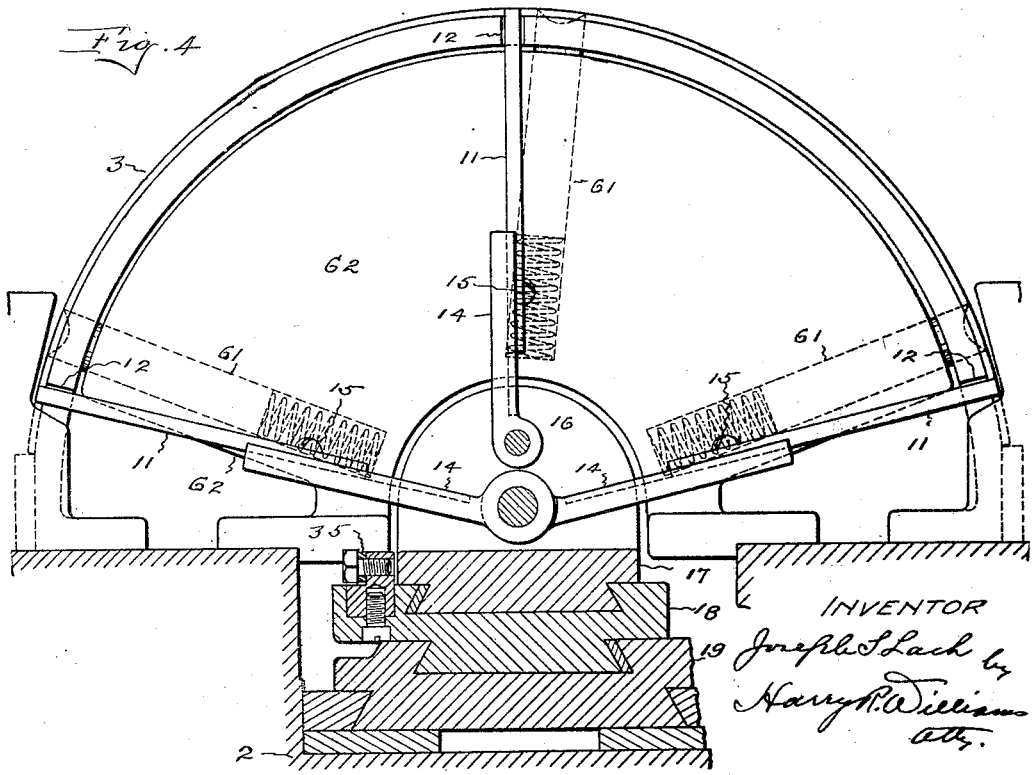

In the accompanying drawings Fig. 1 shows an elevation with parts in central vertical section of a feeding mechanism which embodies the invention and so much of a drilling machine as is necessary to an understanding of the cooperation of the feeding and drilling elements. Fig. 2 shows a plan of the same with portions broken away. Fig. 3 shows on larger scale a plan of the feeding elements and the means employed for causing the feeding mechanism to stop should the feed of the work be obstructed by a broken drill or by jamming of the work, and also when the supply of work in the magazine is exhausted. Fig. 4 is an elevation looking toward the curved saddle and jig showing the positions of the locating plungers and the feed fingers, with the slides by which the fingers are carried in section. Fig. 5 is a sectional elevation through the jig bracket showing the positions of the work clamping arms and the means for actuating the arms. Fig. 6 is a perspective view of a clamping arm. Fig. 7 is a section on the dotted line 7—7 on Fig. 5. Fig. 8 is a side elevation of the mechanism for disconnecting the driving power when it is desirable or necessary to stop the feeding mechanism. Fig. 9 is a side elevation of the electrical contact and switch mechanism which causes the stopping mechanism to operate when the magazine is empty or when there is an obstruction to the feed of the work. Fig. 10 is an edge elevation of the contact and switch mechanism. Fig. 11 is a view looking at the front of the feeding mechanism.

The magazine illustrated is comprised of two vertically arranged troughs 1 mounted on the bed 2. These troughs are of a width substantially equal to the width of the arcuate pieces of work 3 that they are to receive, and they are spaced apart a distance approximately equal to the outside diameter of the pieces of work which in the form of mechanism shown are superposed in the magazine with their concave faces downward, Figs. 1, 11.

Mounted on the bed and extending beneath the discharge end of the magazine is a support or saddle 4 that has its upper surface curved on substantially the same arc as the concave faces of the pieces of work. This saddle extends from the lower end of the magazine to beneath an arcuate jig 5 that has holes 6 in the required localities for guiding the radially arranged tools 7, which may be drills, reamers or counter-bores, which are to operate upon the work, Figs. 1, 2, there being a space 8 between the curved outer face of the saddle and the curved inner face of the jig which is slightly wider than the thickness of a piece of work. The front wall 9 of the jig bracket is fastened to the vertical wall 10 of the machine frame, Fig. 1.

The lowest piece of work in the magazine rests upon the saddle, and it is pushed forward by fingers 11. Three feed fingers are illustrated as movable in slots 12 in the top and in each side of the saddle. The fingers extend out beyond the upper surface of the saddle in such manner that on their forward movements the pieces of work are pushed forward through the space between the saddle and jig. A cover plate 13 is arranged over the saddle between the magazine and the jig to retain the work in place on the saddle, Fig. 1.

The fingers may be, as shown in Figs. 3, 4, adjustably attached to arms 14 by screws 15, which arms are fastened between ears 16 that extend upward from the upper surface of a slide 17. This slide is mounted in a slide 18 which in turn is mounted in a slide 19, movable in a way in the bed, Figs. 3, 4. The lowest slide 19 has downwardly extending ears 20 which are connected by a link 21 with a rocker arm 22 on a shaft 23 that has a rocker arm 24 which by a link 25 is connected with a lever 26. This lever is adapted to be oscillated at the proper time by a suitably shaped cam in the cam disk 27, Figs. 1, 2. By means of this mechanism the slide 19 is reciprocated.

The slide 18 is adjustably fastened to the slide 19 by means of a screw 28 which turns through a lug 29 depending from the front of the slide 18, into the slide 19, and that is provided with a hand wheel 30, Fig. 1. By turning this hand wheel and screw, the intermediate slide 18 may be adjusted with relation to the lowest slide 19 according to the width of the pieces of work to be fed.

The top slide 17, upon which the feed fingers are directly mounted, at one side has a block 31 with a V-shaped notch 32 into which normally extends a V-shaped tongue 33 on a latch 34 that is pivoted to the intermediate slide 18, the tongue being held in the notch by a spring 35, Fig. 3. Should anything obstruct the forward movement of the feed fingers and prevent the top slide from moving forward the tongue on the latch wedges out from the notch and permits the other slides to move without breaking any of the parts. Fig. 3.

When the latch is forced out of the notch it is retained so that on its next forward movement it engages and pushes in a spring pin 36 that is thrust outwardly from the side of a casing 37 that is mounted on the bed at one side of the slides, Fig. 3. When this pin is pushed in it causes a switch 38 to close the electrical circuit, through the conductors 39, Figs. 9, 10. This circuit includes a solenoid coil 40 mounted on a bracket attached to the side of the machine frame, Fig. 8. The solenoid armature 41 is connected by a link 42 with an angle lever 43 one end of which engages one member of a clutch 44 on the drive shaft, Fig. 8. When the circuit is closed by the engagement of the latch 34 with the pin 36, the solenoid 40 causes the clutch to disengage so that the worm 45 will not drive the worm wheel 46 on the cam shaft 47 and the feed mechanism will stop operating, Fig. 8. The feed may also be stopped by swinging the lever 48 which is connected by a link 49 with an arm 50 that is connected to the lever 43, Fig. 8.

Adjustably mounted on the top slide 17 is a bracket 51 and adjustably held by this bracket is a post 52 which at the top has a laterally extending arm 53. This arm holds a sleeve 54 in which is a forwardly pressed spring plunger 55, Fig. 3. Depending from this plunger is a finger 56, Figs. 1, 11. When the feed fingers move forward the plunger 55 is carried forward and it engages with the lowermost piece of work in the magazine and is pressed back. However, if there is no work in the magazine, the supply having been exhausted, the plunger will not be pressed back and the finger 56 will engage with a spring pin 57 that projects from the top of the switch casing 37, Fig. 1. When this pin is pressed in it engages a lever 58 and through a link 59 and lever 60, closes the switch 38. Figs. 9, 10, and causes the feed to be stopped by the throwing of the clutch 44, as before described.

The feed fingers on their forward movements push the lowest piece of work from the magazine along the saddle 4 and under the guard plate 13, past spring plungers 61, Fig. 1, which yield as the work passes and spring up through holes in the saddle after the work has been pushed beyond them. There are three of these spring plungers one at the top and one on each side, supported by an arc-shaped bracket 62 that is adjustably mounted on the bed, Figs. 1, 4. The subsequently fed pieces of work push the previously fed pieces of work along the saddle and beneath the jig. At the third feed the first piece of work is below the arcuate jig 5 which has the holes 6 for the passage of the tools 7. As each piece of work reaches its approximate position beneath the jig, clamping arms 63 are drawn inward and push the pieces that have been fed back against the plungers 61, Fig. 1. Three of these arms are preferably employed, each of which is L-shaped, and the inside edges of the outer legs of the arms are beveled so that when they are drawn in the beveled edges wedge the work back against the plungers and locate the advance piece in exact position to be operated upon. The longer leg of each arm is adjustably fastened to a slide 64, Fig. 6, which is arranged to move radially on the face of the front wall of the jig bracket. The inner end of each arm is provided with a roll 65 which occupies a cam slot 66, Fig. 5, in an oscillatory disk 67, that is attached to a stud 68 which turns in the bracket. This disk has an ear 69 which is connected by links 70, 71, 72, with an arm 73 pivoted on the shaft 74. The arm 73 is by a link 75 connected with a lever 76 that is adapted to be oscillated at the proper time by a cam in the cam disk 77 on the cam shaft of the machine, Figs. 1, 2. This cam is so timed that through the connecting mechanism and the cam slots in the disk the clamping arms are brought down after each feed of a piece of work so as to clamp the work in exact position, and then when the operation of the tools is completed the arms are lifted out of the way so that on the next feed of a piece of work from the magazine the piece which has been operated upon is pushed forward and drops through the open bottom of the jig into a trough 78, down which it slides out of the machine. Any suitable means may be used to ensure the downward movement of the pieces of work in the magazine, such as weights 79, Fig. 11.

The tools may be moved from the interior or exterior toward the work by such mechanism as is described in the application above noted, and as this feed mechanism is driven from the main cam shaft 47 of the machine, the work feed and the tool feed operate in synchronism.

The invention claimed is:

1. A machine of the character described comprising a magazine for receiving the work, a curved saddle adapted to receive the work from the magazine, a curved jig with holes for guiding radially fed tools and located with a space between the jig and saddle, means for feeding the work from the magazine into said space, means for locating and clamping the work in said space, and means movable with the feeding means and adapted to normally engage work in the magazine, and electrically actuated stop means engaged by said means movable with the feeding means when the magazine is empty.

2. A machine of the character described comprising a magazine for receiving the work, a curved saddle adapted to receive work from the magazine, a curved jig with holes for guiding radially fed tools and located with a space between the jig and saddle, means for feeding the work from the magazine into said space, means for locating and clamping the work in said space, means movable with the feeding means for causing the disconnection of the feeding means from the driving mechanism if the feed is obstructed and electrically actuated stop means engaged and caused to operate when said feeding means is disconnected from the driving mechanism.

3. A feed for arcuate pieces of work comprising a magazine for receiving curved work, a saddle curved to conform to the shape of the work, located below and extending beyond the magazine, a jig curved to conform to the shape of the work and having holes for guiding radially fed tools, spaced above the saddle, a plurality of angularly arranged edgewise movable fingers for engaging the edges and pushing the curved pieces of work from the magazine along the saddle to beneath the jig, a plurality of radially movable spring plungers projecting through the saddle into the path of the work, and a plurality of angularly arranged arms adapted to engage the forward edges of the fed work and locate the work beneath the jig against said plungers.

4. A feed for arcuate pieces of work comprising a magazine for receiving curved work, a saddle curved to conform to the shape of the work, located below and extending beyond the magazine, a jig curved to conform to the shape of the work and having holes for guiding radially fed tools, spaced above the saddle, a plurality of angularly arranged fingers movable axially of the curved work beneath the magazine and through slots in the saddle, for engaging the edges and pushing the curved pieces of work from the magazine along the saddle to beneath the jig, a plurality of spring plungers radially movable through the saddle into the path of the work, and a plurality of angularly arranged arms adapted to engage the forward edges of the fed work and clamp the work beneath the jig against said plungers.

5. A feed for arcuate pieces of work comprising a magazine for receiving curved work, a saddle curved to conform to the shape of the work, located below and extending beyond the magazine, a jig curved to conform to the shape of the work and having holes for guiding radially fed tools, spaced above the saddle, an actuating slide, a slide adjustable on the actuating slide, a slide detachably mounted on said adjustable slide, a plurality of fingers radially mounted on said detachable slide for engaging the edges and pushing the curved pieces of work from the magazine along the saddle to beneath the jig, a plurality of plungers radially movable through the saddle into the path of the work, and a plurality of angularly arranged arms adapted to engage the forward edges of the fed work and clamp the work beneath the jig against said plungers.

6. A feed for arcuate pieces of work comprising a magazine for receiving curved work, a saddle curved to conform to the shape of the work, located below and extending beyond the magazine, a jig curved to conform to the shape of the work and having holes for guiding radially fed tools, spaced above the saddle, an actuating slide, a slide adjustable on the actuating slide, a slide detachably mounted on said adjustable slide, a spring latch normally retaining said detachable slide and adjustable slide in operative relation, a plurality of fingers mounted on said detachable slide for engaging the edges and pushing the curved pieces of work from the magazine along the saddle to beneath the jig, a plurality of plungers radially movable through the saddle into the path of the work, and a plurality of angularly arranged arms adapted to engage the forward edges of the fed work and clamp the work beneath the jig against said plungers.

7. A feed for arcuate pieces of work comprising a magazine for receiving curved work, a saddle curved to conform to the shape of the work, located below and extending beyond the magazine, a jig curved to conform to the shape of the work and having holes for guiding radially fed tools, spaced above the saddle, an actuating slide, a slide adjustable on the actuating slide, a slide detachably mounted on said adjustable slide, a latch normally retaining said detachable slide and adjustable slide in operative relation, a plurality of fingers mounted on said detachable slide for engaging the edges and pushing the curved pieces of work from the magazine along the saddle to beneath the jig, a plurality of plungers radially movable through the saddle into the path of the work, a plurality of angularly arranged arms adapted to engage the forward edges of the fed work and clamp the work beneath the jig against said plungers, and an electrical contact adapted to be engaged by said latch when the latch is in position to disconnect said slides.

8. A feed for arcuate pieces of work comprising a magazine for receiving curved work, a saddle curved to conform to the shape of the work, located below and extending beyond the magazine, a jig curved to conform to the shape of the work and having holes for guiding radially fed tools, spaced above the saddle, an actuating slide, a slide adjustable on the actuating slide, a slide detachably mounted on said adjustable slide, a plurality of fingers radially mounted on said detachable slide for engaging the edges and pushing the curved pieces of work from the magazine along the saddle to beneath the jig, a plurality of plungers radially movable through the saddle into the path of the work, a plurality of angularly arranged arms adapted to engage the forward edges of the fed work and clamp the work beneath the jig against said plungers, a spring plunger mounted on said detachable slide and adapted to be carried thereby into engagement with work in the magazine, an electrical contact, and means carried by said plunger and adapted to engage said contact upon failure of said plunger to engage a piece of work in the magazine.

9. A feed for arcuate pieces of work comprising a magazine for receiving curved work, a saddle curved to conform to the shape of the work, located below and extending beyond the magazine, a jig curved to conform to the shape of the work and having holes for guiding radially fed tools, spaced above the saddle, a plurality of angularly arranged edgewise movable fingers for engaging the edges and pushing the curved pieces of work from the magazine along the saddle to beneath the jig, a plurality of radially movable spring plungers projecting through the saddle into the path of the work, a plurality of angularly arranged arms movable radially of the work, said arms having beveled ends adapted to engage the forward edges of the fed work and push the work back against said plungers.

10. A feed for arcuate pieces of work comprising a magazine for receiving curved work, a saddle curved to conform to the shape of the work, located below and extending beyond the magazine, detachably connected slides movable axially of the work, means normally retaining said slides in operative relation, a plurality of angularly arranged fingers carried by said slides, for engaging the edges and pushing the curved pieces of work from the magazine along the saddle, a plurality of plungers radially movable into the path of the work, a plurality of angularly arranged arms adapted to engage the forward edges of the fed work and clamp the work against said plungers, a driving mechanism including a clutch, and electrical means actuated by the disconnection of said slides for disconnecting said clutch and interrupting the movement of the slides.

11. A feed for arcuate pieces of work comprising a magazine for receiving curved work, a saddle curved to conform to the shape of the work, located below and extending beyond the magazine, a plurality of angularly arranged fingers movable axially of the curved work beneath the magazine and through slots in the saddle, for engaging the edges and pushing the curved pieces of work from the magazine along the saddle, a plurality of radially yielding plungers projecting through the saddle into the path of the work, a plurality of angularly arranged arms with beveled ends adapted to engage the forward edges of the fed work and clamp the work on the saddle against said plungers, and means for imparting radial movement to said arms.

JOSEPH S. LACH.